2 Sheets—Sheet 1.
T. SAULT.
Cleaning Rubber and other Gums.
No. 27,160. Patented Feb. 14, 1860.
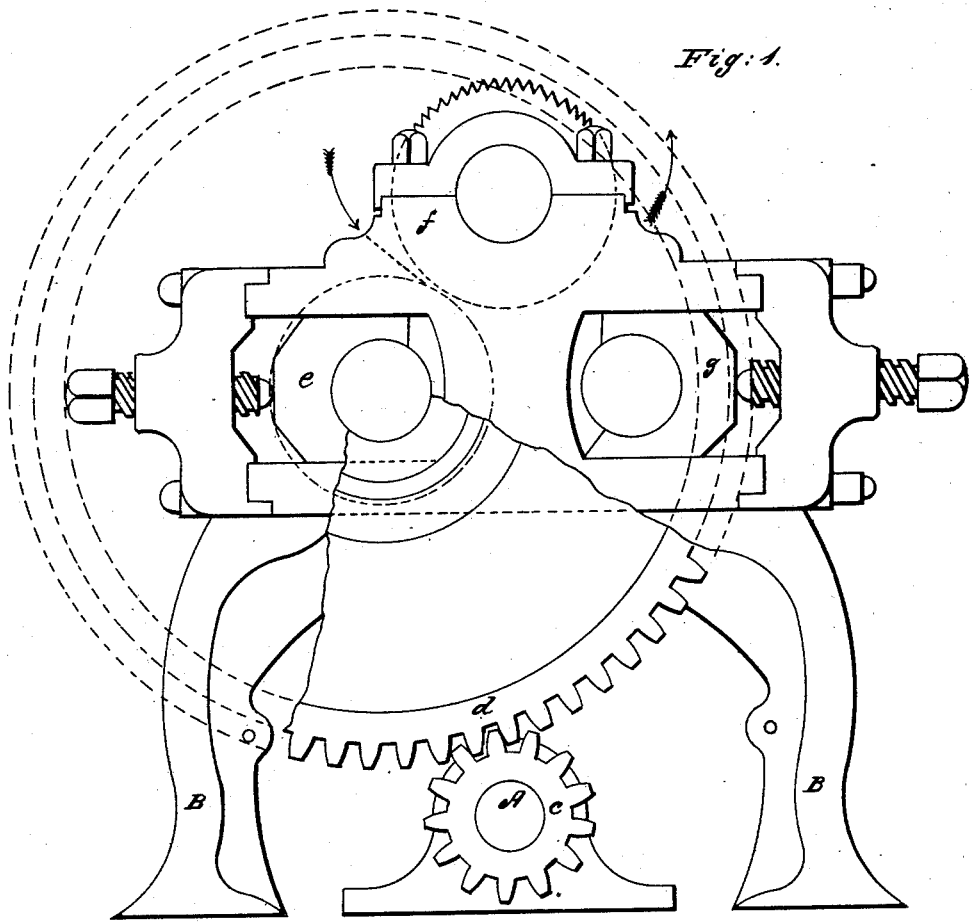
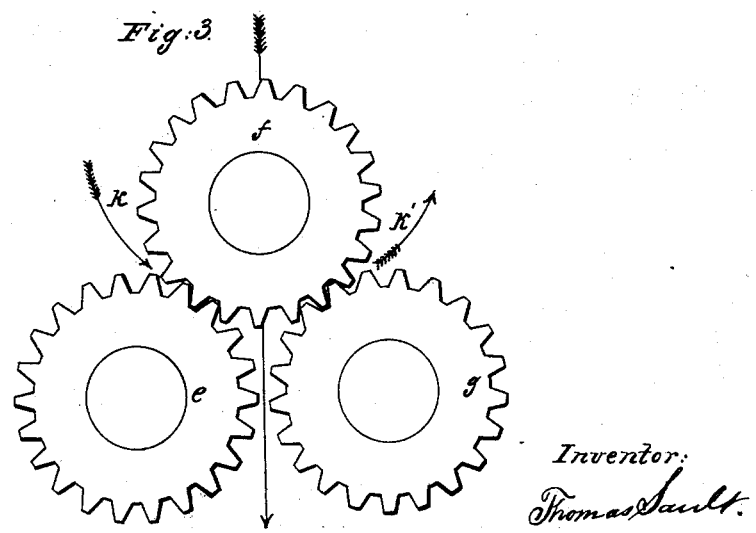
Witnesses:
Sam'l L. Bunson
Austin G. Day
Inventor:
Thomas Sault

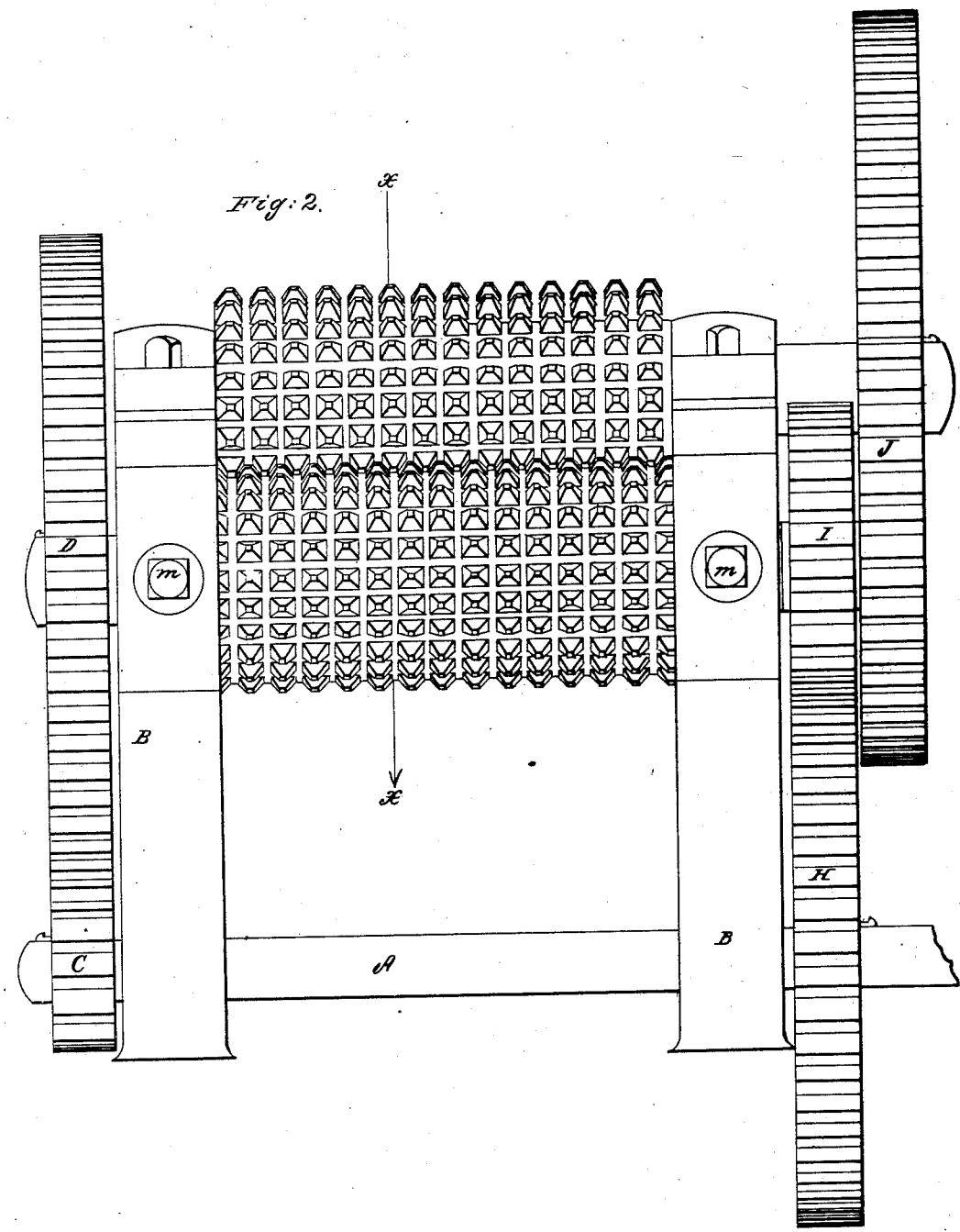

UNITED STATES PATENT OFFICE.

THOMAS SAULT, OF SEYMOUR, CONNECTICUT.

ROLLER FOR WORKING CAOUTCHOUC AND ALLIED GUMS.

Specification of Letters Patent No. 27,160, dated February 14, 1860.

*To all whom it may concern:*

Be it known that I, THOMAS SAULT, of the town of Seymour, county of New Haven, and State of Connecticut, have invented a new and improved method of breaking down and clearing crude commercial gums, as caoutchouc, gutta-percha, &c., by running the same between toothed rollers and otherwise treating the same in the manner hereinafter to be described in this specification.

The rollers as used by me, are designed to receive the crude gum without any preparation or occasionally it is softened by steam or hot water, previous to being fed into the rollers. These rollers, either in pairs or in trios, are armed with quadrangular and pyramidal teeth, arranged rectangularly on the cylinders of the rollers and meshing into each other like the teeth of a pinion receive the gum between them, squeezing it, tearing it and stretching it, loosen and detach bark, sand, sticks, and other foreign bodies of which the following is a full and exact description.

The rollers called "grinders" ordinarily used in the manufacture of vulcanizable gums, for mixing and grinding with sulfur, other substances are smooth cylinders worked in pairs, one set for mixing and grinding with sulfur, and another for sheeting pressing the gum into the pores of canvas or other fibrous texture, or for making pure sheets of rubber.

The rollers I use are armed with teeth and are in sets of three, and are called "breaking rollers," but may also be used for sheeting purposes, as hereinafter described, as well as for mixing and grinding. I also use toothed rollers in pairs which are better for sheeting purposes than in threes. The sheeting operation is performed as the last part of the process of cleaning rubber, as that process which was described and patented by Austin G. Day 10 June, 1856. In this process, the gum, after having been suitably torn, squeezed, washed and cleaned is carried through the rollers in a compact mass and spread out into sheets of open work somewhat resembling a hempen door mat; in which the teeth of the rollers have struck through the goods leaving a honey combed structure, by which the moisture quickly dries out, and the rubber is soon seasoned fit for manufacturing.

The rollers best fitted for breaking down the crude rubber are those arranged in threes. Water is abundantly supplied to the rollers during the whole operation of breaking. The rollers are arranged and geared together so that one shall move faster than the other. Thus the peripheries of the rollers travel through different spaces in the same time, and produce what is called the slipping movement which squeezes out any liquids contained in the gum, and stretches it as it passes between the rollers. This operation of stretching causes the gum to pull away from contact with bark and sticks previously mixed therewith, and which, not having the elasticity of the rubber or other gum, are detached and separated from the foreign bodies, and the rollers are thus fitted for the cleaning process previously named and for which these rollers were specially designed to be used.

The three roller machine is so arranged that if the periphery of the first move through 10 feet in a minute that of the second will move through 30 feet, in the same length of time and that of the third, through 90 feet. The function of the rollers, 1 and 2, acting together break down and hold the gum, while 2 and 3 acting together so stretch and rasp the surface, that while rollers 1 and 2 by their slower movement hold on to one part of the gum, numbers 2 and 3, by their more rapid movement pull on another portion and stretch it, and open sap cavities, detach bark and sand, and other foreign matters not having the elastic nature of the gum, and thus prepare it by tearing and comminuting for the cleaning process of Mr. Day already referred to.

It is true that toothed rollers in pairs, as heretofore used by me, may be made to perform the same work as the three roller machine, but not so rapidly, nor so well; although for some kinds of gum and for some purposes, the two roller machine will answer. The Tara rubber may be easily worked in this way.

After the crude gum has passed through the breaking rollers, for the purpose of putting it into the most convenient form for drying rapidly and seasoning, (a process indispensable to successful vulcanization) I pass the article through a pair of rollers having similar teeth to those already referred to but having finer and closer teeth. The peripheries of these two rollers move less unequally than those of the three roller machines. Thus if roller 1 moves ten feet in a minute, roller 2 will move twenty feet. This arrangement being a compressing and stretching operation forms a porous honeycomb sheet of a convenient length and shape for hanging up instead of spreading upon a floor as often practiced heretofore. But this is by no means the whole scope and use of these toothed rollers. They may be used by manufacturers for what is termed the grinding and mixing process, and may with advantage be made to supersede the use of plane rollers or grinders. A large per cent. of the quality and strength of caoutchouc is destroyed by too much grinding, in mixing the composition.

My machine will mix and prepare the work with less grinding, quicker done, and will thus furnish a better article, and cheaper, from the same stock, than any other known mode of working.

There are three important steps to be taken before the cleaned and dried caoutchouc is ready to be manufactured in the various articles for use. The first consists in grinding and softening on rollers heated by steam preparatory to mixing in the composition. The second in mixing the composition on similar rollers with less heat preparatory to the calendering process. Third, the calendering process or spreading the gum into sheets, or upon cloth, &c., for manufacturing it into various articles, and this operation is generally performed by the well known Chaffee machine.

The two roller machine will perform the work of the first and second steps more perfectly, faster, and with less injury to the gum, than the machines now in use for the purpose.

In the accompanying drawings Figure 1 is a side elevation of the frame of the 3 rollers; Fig. 2 a front elevation of the same; Fig. 3 a section on line $xx$, of Fig. 2.

Similar letters and figures in the drawings refer to similar parts in the machine.

A, is a counter shaft to transfer motion to the rollers.

B, B, is the frame to sustain the rollers.

C, is the gear on countershaft A.

(D) is the gear on the feeding roller.

($e$) represents the feeding roller moving ten revolutions per minute; ($f$) the crushing roller moving thirty revolutions per minute and driven by the main shaft; ($g$) the friction or stretching roller moving ninety revolutions per minute.

H is the gear on the counter shaft for driving the rollers.

I is the gear on feeding roller ($e$).

J is the gear on the crushing roller, F, to be driven by the main shaft.

($k, k'$) are arrows indicating the entrance and exit of the gum.

($m, m'$,) are set screws for fixing the space between the rollers, according to the character of the material. Roller $e$ and $g$ has the set screws; $f$ has none, as the distances of the rollers apart can be varied sufficiently by the set screws in $e$, and $g$.

If the teeth of the breaking rollers be carefully and critically examined as to their arrangement on the rollers, it will be found in each roller the teeth are in rows parallel with the axis, and in rows following the periphery at right angles with the former. Also the rows of teeth at right angles with the axis on roller $e$, fall, or mesh, into the intervening spaces between the corresponding rows of teeth on roller $f$. The projecting part of each tooth above, or beyond, the plane of the roller is a pyramid, or the half of an octahedron.

Having now described the means which I have devised for breaking down the crude caoutchouc or other equivalent vulcanizable crude material capable of being so treated and having shown that rollers in pairs as well as in threes may be used for the purpose of breaking and cleaning the crude gum I do not confine my invention to the number of rollers used in a set, nor do I claim what is called the slipping motion in rollers, that having been already used by others, for grinding rubber and mixing in foreign matter as sulfur, white lead, &c. But so far as I know no one has attempted to break down and clear the crude gum by running it through pairs or trios of toothed rollers.

Therefore what I claim as my invention and desire to secure by Letters Patent is—

The breaking down, comminuting and cleaning of crude commercial vulcanizable gums, separating them from foreign bodies by toothed rollers substantially as set forth, whether the rollers be in pairs or in threes or any other numbers.

THOMAS SAULT.

Witnesses:
SAML. L. BRONSON,
AUSTIN G. DAY.